United States Patent
Parkinson et al.

(10) Patent No.: US 8,356,342 B2
(45) Date of Patent: Jan. 15, 2013

(54) METHOD AND SYSTEM FOR ISSUING A KILL SEQUENCE FOR A TOKEN

(75) Inventors: Steven William Parkinson, Mountain View, CA (US); Nang Kon Kwan, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 826 days.

(21) Appl. No.: 11/469,482

(22) Filed: Aug. 31, 2006

(65) Prior Publication Data

US 2008/0056496 A1  Mar. 6, 2008

(51) Int. Cl.
*G06F 21/00* (2006.01)
*H04L 9/00* (2006.01)

(52) U.S. Cl. .......................................... 726/9; 380/277
(58) Field of Classification Search .................. 380/277; 726/9
See application file for complete search history.

(56) References Cited

U.S. PATENT DOCUMENTS

| | | | |
|---|---|---|---|
| 4,108,367 A | 8/1978 | Hannan | |
| 4,849,614 A | 7/1989 | Watanabe et al. | |
| 4,924,330 A | 5/1990 | Seamons et al. | |
| 5,247,163 A | 9/1993 | Ohno et al. | |
| 5,355,414 A | 10/1994 | Hale et al. | |
| 5,499,371 A | 3/1996 | Henninger et al. | |
| 5,594,227 A | 1/1997 | Deo | |
| 5,631,961 A | 5/1997 | Mills et al. | |
| 5,666,415 A | 9/1997 | Kaufman | |
| 5,721,777 A * | 2/1998 | Blaze | 380/286 |
| 5,721,781 A | 2/1998 | Deo et al. | |
| 5,745,576 A | 4/1998 | Abraham et al. | |
| 5,745,678 A | 4/1998 | Herzberg et al. | |
| 5,768,373 A | 6/1998 | Lohstroh et al. | |
| 5,862,310 A | 1/1999 | Crawford et al. | |
| 5,923,884 A | 7/1999 | Peyret et al. | |
| 5,937,066 A | 8/1999 | Gennaro et al. | |
| 5,943,423 A | 8/1999 | Muftic | |
| 5,991,411 A | 11/1999 | Kaufman et al. | |
| 5,991,882 A | 11/1999 | O'Connell | |
| 6,005,942 A | 12/1999 | Chan et al. | |
| 6,005,945 A | 12/1999 | Whitehouse | |
| 6,011,847 A | 1/2000 | Follendore, III | |
| 6,016,476 A | 1/2000 | Maes et al. | |
| 6,044,155 A | 3/2000 | Thomlinson et al. | |
| 6,072,876 A | 6/2000 | Obata et al. | |

(Continued)

FOREIGN PATENT DOCUMENTS

WO    9724831    7/1997

(Continued)

OTHER PUBLICATIONS

"ATM and Credit Card Notification", Feb. 2005 (internet archive) pp. 1-2, www.thereareplaces.com/infgdes/money.atmnotif.htm.*

(Continued)

*Primary Examiner* — Farid Homayounmehr
*Assistant Examiner* — Lisa Lewis
(74) *Attorney, Agent, or Firm* — Lowenstein Sandler PC

(57) ABSTRACT

An embodiment relates generally to a method of managing a token. The method includes marking a token to be killed and detecting a presence of the token. The method also includes disabling the token in response to the marking of the token.

21 Claims, 4 Drawing Sheets

U.S. PATENT DOCUMENTS

| | | |
|---|---|---|
| 6,141,420 A | 10/2000 | Vanstone et al. |
| 6,178,507 B1 | 1/2001 | Vanstone |
| 6,179,205 B1 | 1/2001 | Sloan |
| 6,226,744 B1 | 5/2001 | Murphy et al. |
| 6,377,825 B1 | 4/2002 | Kennedy et al. |
| 6,490,680 B1 | 12/2002 | Scheidt et al. |
| 6,502,108 B1 | 12/2002 | Day et al. |
| 6,539,093 B1 | 3/2003 | Asad et al. |
| 6,636,975 B1 | 10/2003 | Khidekel et al. |
| 6,643,701 B1 | 11/2003 | Aziz et al. |
| 6,687,190 B2 | 2/2004 | Momich et al. |
| 6,691,137 B1 | 2/2004 | Kishi |
| 6,698,654 B1 | 3/2004 | Zuppicich |
| 6,734,886 B1 | 5/2004 | Hagan et al. |
| 6,760,752 B1 | 7/2004 | Liu et al. |
| 6,804,687 B2* | 10/2004 | Sampson ............................ 1/1 |
| 6,819,766 B1 | 11/2004 | Weidong |
| 6,826,686 B1 | 11/2004 | Peyravian |
| 6,829,712 B1 | 12/2004 | Madoukh |
| 6,880,037 B2 | 4/2005 | Boyer |
| 6,880,084 B1 | 4/2005 | Brittenham et al. |
| 6,898,605 B2 | 5/2005 | Constantino |
| 6,898,714 B1 | 5/2005 | Nadalin et al. |
| 6,931,133 B2 | 8/2005 | Andrews et al. |
| 6,941,326 B2 | 9/2005 | Kadyk et al. |
| 6,970,970 B2 | 11/2005 | Jung et al. |
| 6,978,933 B2 | 12/2005 | Yap et al. |
| 6,986,040 B1 | 1/2006 | Kramer et al. |
| 7,007,105 B1 | 2/2006 | Sullivan et al. |
| 7,010,600 B1 | 3/2006 | Prasad et al. |
| 7,050,589 B2 | 5/2006 | Kwan |
| 7,051,213 B1 | 5/2006 | Kobayashi et al. |
| 7,085,386 B2 | 8/2006 | Audebert et al. |
| 7,114,028 B1 | 9/2006 | Green et al. |
| 7,156,302 B2 | 1/2007 | Yap et al. |
| 7,159,763 B2 | 1/2007 | Yap et al. |
| 7,185,018 B2 | 2/2007 | Archbold et al. |
| 7,251,728 B2 | 7/2007 | Toh et al. |
| 7,278,581 B2 | 10/2007 | Ong |
| 7,299,364 B2 | 11/2007 | Noble et al. |
| 7,302,585 B1 | 11/2007 | Proudler et al. |
| 7,356,688 B1 | 4/2008 | Wang |
| 7,374,099 B2 | 5/2008 | de Jong |
| 7,386,705 B2 | 6/2008 | Low et al. |
| 7,437,757 B2 | 10/2008 | Holdsworth |
| 7,451,921 B2 | 11/2008 | Dowling et al. |
| 7,475,250 B2 | 1/2009 | Aull et al. |
| 7,475,256 B2 | 1/2009 | Cook |
| 7,480,384 B2 | 1/2009 | Peyravian et al. |
| 7,502,793 B2 | 3/2009 | Snible et al. |
| 7,571,321 B2 | 8/2009 | Appenzeller et al. |
| 7,602,910 B2 | 10/2009 | Johansson et al. |
| 7,702,917 B2 | 4/2010 | Tevosyan et al. |
| 7,769,996 B2 | 8/2010 | Randle et al. |
| 7,822,209 B2 | 10/2010 | Fu et al. |
| 7,860,243 B2 | 12/2010 | Zheng et al. |
| 2001/0008012 A1 | 7/2001 | Kausik |
| 2001/0036276 A1 | 11/2001 | Ober et al. |
| 2001/0054148 A1 | 12/2001 | Hoornaert et al. |
| 2002/0004816 A1 | 1/2002 | Vange et al. |
| 2002/0007351 A1 | 1/2002 | Hillegass et al. |
| 2002/0007359 A1 | 1/2002 | Nguyen |
| 2002/0010679 A1 | 1/2002 | Felsher |
| 2002/0029343 A1 | 3/2002 | Kurita |
| 2002/0056044 A1 | 5/2002 | Andersson |
| 2002/0059144 A1 | 5/2002 | Meffert et al. |
| 2002/0064095 A1 | 5/2002 | Momich et al. |
| 2002/0080958 A1 | 6/2002 | Ober et al. |
| 2002/0099727 A1 | 7/2002 | Kadyk et al. |
| 2002/0112156 A1 | 8/2002 | Glen et al. |
| 2002/0120842 A1 | 8/2002 | Bragstad et al. |
| 2002/0133707 A1 | 9/2002 | Newcombe |
| 2002/0171546 A1 | 11/2002 | Evans et al. |
| 2002/0184149 A1 | 12/2002 | Jones |
| 2002/0188848 A1 | 12/2002 | Buttiker |
| 2003/0005291 A1 | 1/2003 | Burn |
| 2003/0012386 A1 | 1/2003 | Kim et al. |
| 2003/0028664 A1 | 2/2003 | Tan et al. |
| 2003/0035548 A1 | 2/2003 | Kwan |
| 2003/0056099 A1 | 3/2003 | Asanoma et al. |
| 2003/0075610 A1 | 4/2003 | Ong |
| 2003/0093695 A1 | 5/2003 | Dutta |
| 2003/0115455 A1 | 6/2003 | Aull et al. |
| 2003/0115466 A1 | 6/2003 | Aull et al. |
| 2003/0115467 A1 | 6/2003 | Aull et al. |
| 2003/0115468 A1 | 6/2003 | Aull et al. |
| 2003/0167399 A1 | 9/2003 | Audebert et al. |
| 2003/0172034 A1 | 9/2003 | Schneck et al. |
| 2004/0042620 A1 | 3/2004 | Andrews et al. |
| 2004/0053642 A1 | 3/2004 | Sandberg et al. |
| 2004/0066274 A1 | 4/2004 | Bailey |
| 2004/0088562 A1 | 5/2004 | Vassilev et al. |
| 2004/0096055 A1 | 5/2004 | Williams et al. |
| 2004/0103324 A1 | 5/2004 | Band |
| 2004/0103325 A1 | 5/2004 | Priebatsch |
| 2004/0120525 A1 | 6/2004 | Miskimmin et al. |
| 2004/0144840 A1 | 7/2004 | Lee et al. |
| 2004/0146163 A1 | 7/2004 | Asokan et al. |
| 2004/0153451 A1 | 8/2004 | Phillips et al. |
| 2004/0162786 A1 | 8/2004 | Cross et al. |
| 2004/0230831 A1 | 11/2004 | Spelman et al. |
| 2005/0022123 A1 | 1/2005 | Costantino |
| 2005/0033703 A1 | 2/2005 | Holdsworth |
| 2005/0109841 A1 | 5/2005 | Ryan et al. |
| 2005/0114673 A1 | 5/2005 | Raikar et al. |
| 2005/0119978 A1 | 6/2005 | Ates |
| 2005/0123142 A1 | 6/2005 | Freeman et al. |
| 2005/0138386 A1 | 6/2005 | Le Saint |
| 2005/0138390 A1 | 6/2005 | Adams et al. |
| 2005/0144312 A1 | 6/2005 | Kadyk et al. |
| 2005/0184163 A1 | 8/2005 | de Jong |
| 2005/0184164 A1 | 8/2005 | de Jong |
| 2005/0184165 A1 | 8/2005 | de Jong |
| 2005/0188360 A1 | 8/2005 | de Jong |
| 2005/0216732 A1 | 9/2005 | Kipnis et al. |
| 2005/0262361 A1 | 11/2005 | Thibadeau |
| 2005/0279827 A1* | 12/2005 | Mascavage et al. ........... 235/380 |
| 2005/0289652 A1 | 12/2005 | Sharma et al. |
| 2006/0005028 A1 | 1/2006 | Labaton |
| 2006/0010325 A1 | 1/2006 | Liu et al. |
| 2006/0015933 A1 | 1/2006 | Ballinger et al. |
| 2006/0036868 A1 | 2/2006 | Cicchitto |
| 2006/0043164 A1 | 3/2006 | Dowling et al. |
| 2006/0072747 A1 | 4/2006 | Wood et al. |
| 2006/0073812 A1 | 4/2006 | Punaganti Venkata et al. |
| 2006/0075133 A1 | 4/2006 | Kakivaya et al. |
| 2006/0075486 A1 | 4/2006 | Lin et al. |
| 2006/0101111 A1 | 5/2006 | Bouse et al. |
| 2006/0101506 A1 | 5/2006 | Gallo et al. |
| 2006/0173848 A1 | 8/2006 | Peterson et al. |
| 2006/0174104 A1 | 8/2006 | Crichton et al. |
| 2006/0206932 A1 | 9/2006 | Chong |
| 2006/0208066 A1 | 9/2006 | Finn et al. |
| 2006/0226243 A1* | 10/2006 | Dariel ........................... 235/492 |
| 2006/0291664 A1 | 12/2006 | Suarez et al. |
| 2006/0294583 A1 | 12/2006 | Cowburn et al. |
| 2007/0014416 A1 | 1/2007 | Rivera et al. |
| 2007/0074034 A1 | 3/2007 | Adams et al. |
| 2007/0112721 A1 | 5/2007 | Archbold et al. |
| 2007/0113267 A1 | 5/2007 | Iwanski et al. |
| 2007/0113271 A1 | 5/2007 | Pleunis |
| 2007/0118891 A1 | 5/2007 | Buer |
| 2007/0162967 A1 | 7/2007 | de Jong et al. |
| 2007/0169084 A1 | 7/2007 | Frank et al. |
| 2007/0189534 A1 | 8/2007 | Wood et al. |
| 2007/0204333 A1 | 8/2007 | Lear et al. |
| 2007/0230706 A1 | 10/2007 | Youn |
| 2007/0271601 A1 | 11/2007 | Pomerantz |
| 2007/0277032 A1 | 11/2007 | Relyea |
| 2007/0280483 A1 | 12/2007 | Fu |
| 2007/0282881 A1 | 12/2007 | Relyea |
| 2007/0283163 A1 | 12/2007 | Relyea |
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |

| | | |
|---|---|---|
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0059790 A1 | 3/2008 | Parkinson |
| 2008/0059793 A1 | 3/2008 | Lord et al. |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1* | 1/2009 | Lee et al. .................. 380/277 |
| 2009/0133107 A1 | 5/2009 | Thoursie |
| 2010/0313027 A1 | 12/2010 | Taylor |

FOREIGN PATENT DOCUMENTS

| | | |
|---|---|---|
| WO | 0048064 A1 | 8/2000 |
| WO | 2007096590 A1 | 8/2007 |

OTHER PUBLICATIONS

"AMD Announces Specification for Open Platform Management Architecture". Feb. 28, 2005 pp. 1-2 http://www.thefreelibrary.com/AMD+Announces+Specification+for+Open+Platform+Management+Architecture-a0129342307.*

Balfanz (Dirk ABalfanz, "Access Control for Ad-Hoc Collaboration", Princeton University Jan. 2001).

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Source Code in C", 1996, John Wiley & Sons, Inc., Second Edition, pp. 455-456.

Zuccherato, Robert, "Elliptic Curve Cryptography Support in Entrust", May 9, 2000.

Red Hat Certificate System, http://www.redhat.com/f/pdf/rhas/DirSecProductSheetCertificateSystem.pdf, Jun. 2005.

PKCS#11 v2.20: Cryptographic Token Interface Standard, RSA Laboratories, Jun. 28, 2004, (see, e.g. Chapter 10, Objects) (see www.rsasecurity.com, 407 pgs).

Cryptographic Message Syntax, R. Housley, Request for Comments (RFC) 2630, Network Working Group, The Internet Society, Jun. 1999.

Schneier, Bruce. Applied Cryptography, Second Edition. 1996 John Wiley and Sons, pp. 480-481.

* cited by examiner

METHOD AND SYSTEM FOR ISSUING A KILL SEQUENCE FOR A TOKEN

FIELD

This invention relates generally to managing a token, more particularly, to method and system for issuing a kill sequence for a token.

DESCRIPTION OF THE RELATED ART

Smart cards are not merely a piece of plastic with a strip of magnetic material. Smart cards also store and process information. Smart cards are storage devices with the core mechanics to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

Smart cards are a way to increase security especially for enterprise systems. Enterprise system often contain valuable information such as financial data, personnel records, strategies, etc., that may be critical for the entity administrating the enterprise system. Moreover, for at least the reasons described above, smart cards may offer a mechanism to control access to data within the enterprise systems. Accordingly, the reasons to use smart card are plentiful.

In a large enterprise configuration, there may be a large number of employees, each employee being issued a smart card or token. On occasion, the tokens may be canceled and new smart cards reissued. This may be the result of a security breach or part of a security protocol. The administrator has to collect the old smart cards, disable each card and erase the resident memory of the token and then issue the new smart cards. The collection process and destruction may involve a large amount of man-hours for a single administrator to accomplish. Accordingly, there is a need for a convenient and remote method of disabling and erasing large number of tokens.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Embodiments pertain generally to systems and methods for managing tokens. More specifically, a token kill option may be implemented in an enterprise security system. The enterprise security system may be configured for users to interface and manage their secure applications from enrolling tokens to interfacing with secure applications. A user may mark a token to be killed with the token kill option. Subsequently, when the marked token is inserted into a token reader, the enterprise security may be configured to remove any private key stored and/or overwrite the private keys with zeros on the marked token and then is disabled permanently, i.e., killed. In other embodiments, the enterprise system may remove the private key and/or overwrite zeros in the place of any private keys but then allow the tokens to be recycled.

For simplicity and illustrative purposes, the principles of the present invention are described by referring mainly to exemplary embodiments thereof. However, one of ordinary skill in the art would readily recognize that the same principles are equally applicable to, and can be implemented in, all types of secure computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
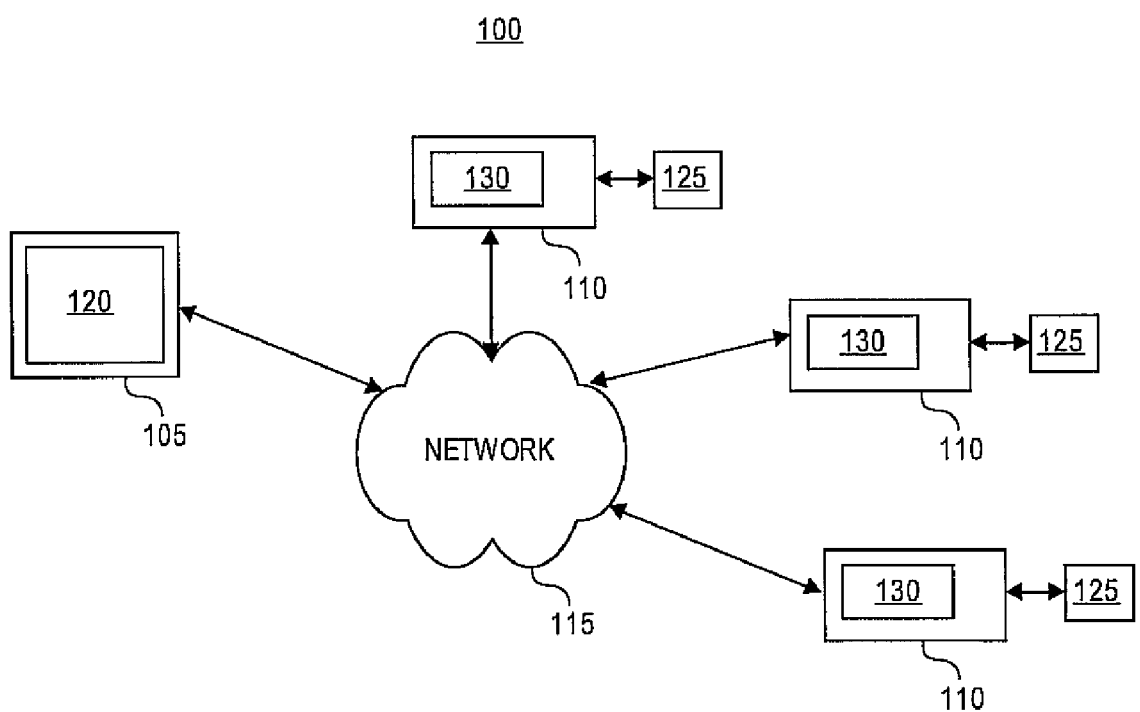
FIG. 1 illustrates an exemplary system in accordance with an embodiment.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a token management system 120 through a multiple user operating system (not shown) in conjunction with the clients 110. The server 105 may be implemented with server platforms as known to those skilled in the art from Intel, Advanced Micro Devices, Hewlett-Packard, Dell, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform configured to execute secure and open applications through the multi-user operating system. The clients 110 may be implemented with personal computers, workstations, thin clients, thick clients, or other similar computing platform. The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token, such as a smart card, to access the respective client 110. Each client 110 may have a security client 130 executing to monitor and manage the security device 125.

The security client 130 may be configured to manage the token. More specifically, the security client 130 may enroll the token, recover keys for the token or reset a personal identification number for the token. The security client 130 may also be configured to interface with the token management system 120 and act as a proxy for application program data units (APDUs) between the token management system 120 and the token. The security client 130 may be further configured to display user interfaces as the token management system 120 directs, i.e., prompting the user for credentials and/or PIN, displaying token status.

Figure 2:
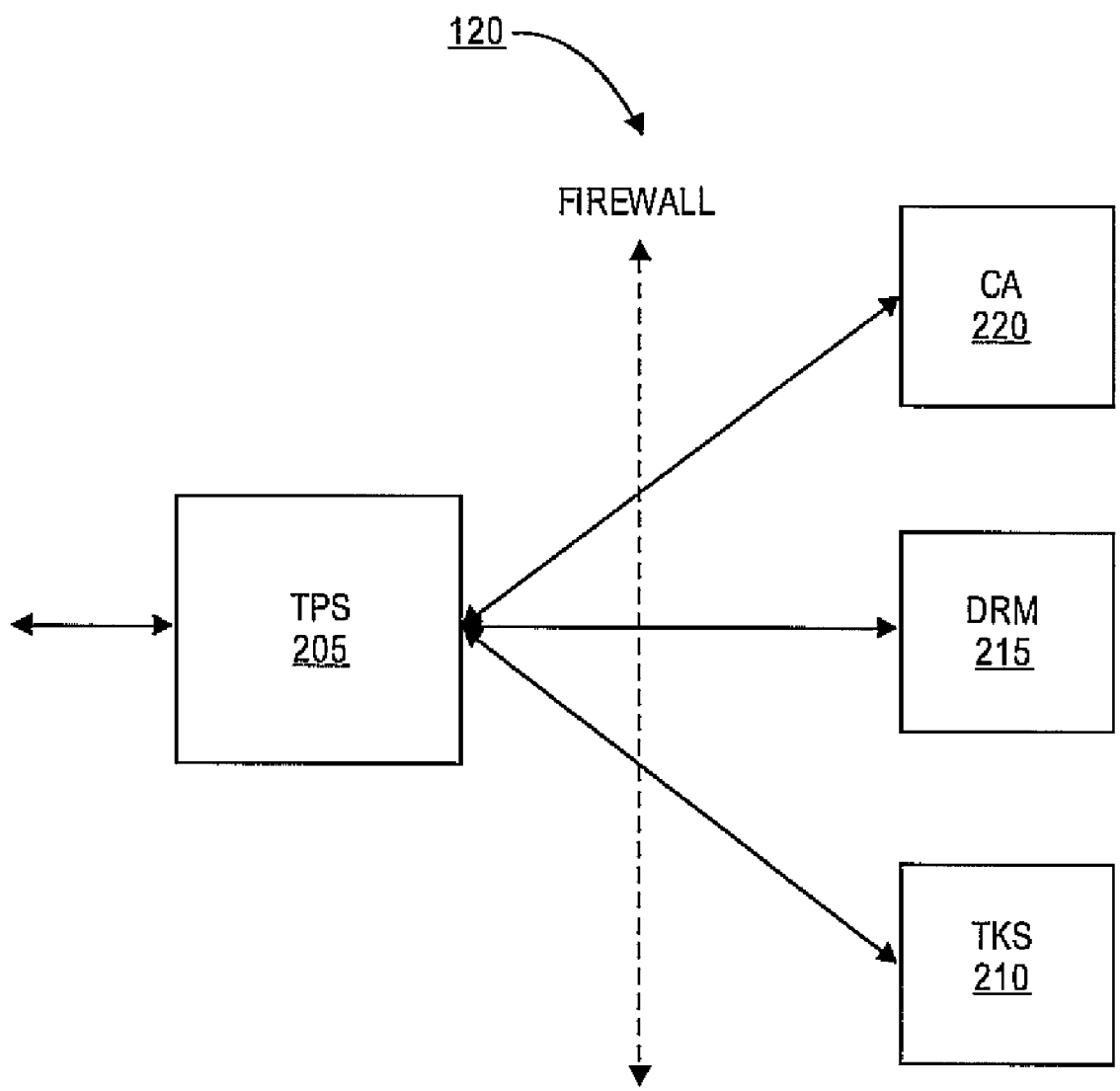
FIG. 2 illustrates an exemplary token management system in accordance with another embodiment.

The token management system 120 comprises several modules, as depicted in FIG. 2. FIG. 2 shows an exemplary architecture of the token management system 120 in accordance with another embodiment. It should be readily apparent to those of ordinary skill in the art that the token management system 120 depicted in FIG. 2 represents a generalized schematic illustration and that other components may be added or existing components may be removed or modified. Moreover, the token management system 120 may be implemented using software components, hardware components, or combinations thereof.

As shown in FIG. 2, the token management system 120 includes a token processing system (labeled as TPS in FIG. 2) 205, a token key service (TKS) module 210, a data recovery manager (DRM) module 215 and a certificate authority (CA) module 220. The TPS 205 may be configured to act as a registration authority. The TPS 205 may direct the enrollment process. The TPS 205 may also be configured to act as a gateway between security clients 130, tokens, and the modules of the token management system 120.

The TKS module 210 may be configured to maintain master keys for the tokens. The TKS module 210 may also store symmetric keys associated with the token. These keys may be derived from a single master key combined with smart card serial number or identification number, i.e., the CID. The manufacturer of the smart card may store these symmetric keys onto the token. The manufacturer may also forward the single master key to the administrator of the token management system 120, who installs the key into the TKS module 210.

The DRM module 215 may be configured to maintain a database of encrypted subject's private keys, which can be recovered on demand by an appropriate process.

The CA module 220 may be configured to generate X.509 certificates in response to received subject public key information and certificate enrollment requests.

Figure 3:
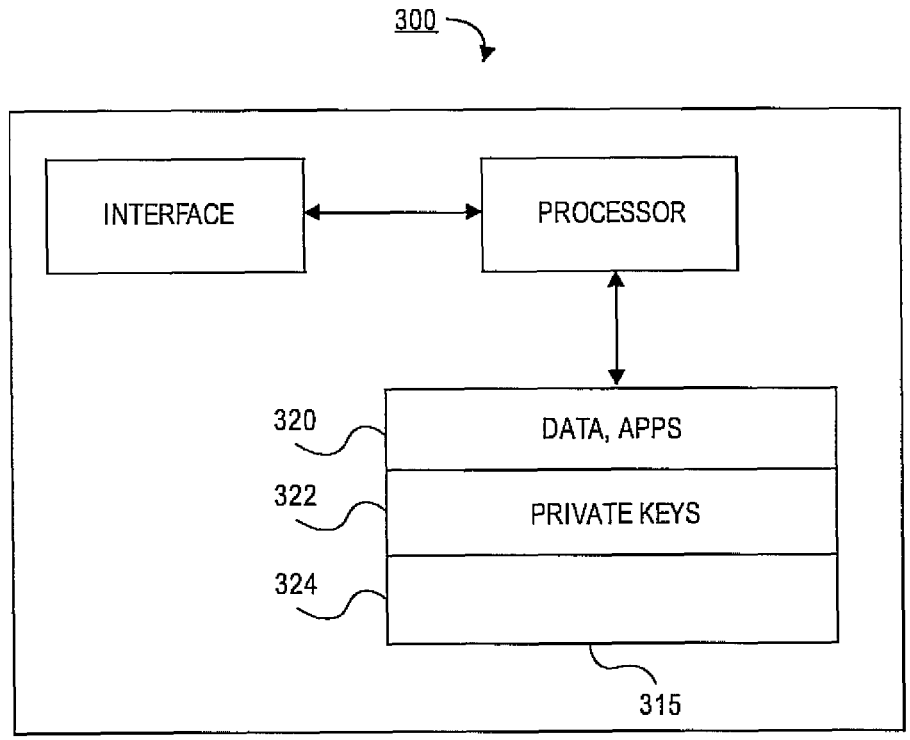
FIG. 3 illustrates a block diagram of a token in accordance with another embodiment.

In some embodiments, a user may mark or flag a token to be zeroed out ("killed", secure erase, etc.). More specifically, the user may use the security client 130 to invoke a menu option to flag a token to be zeroed out. Tokens may be configured with a microchip that comprises an interface, a processor, and memory, as depicted in FIG. 3. As shown in FIG. 3, the token 300 includes an interface 305, a processor 310, and memory 315. The interface 305, the processor 310 and the memory 315 may be implemented with an application specific integrated circuit, field programmable gate array, or other similar technologies.

In addition, in some embodiments, an administrator of token management system 120 is also enabled to kill token 300. For example, an administrator may be provided an administration function that allows the administrator to trigger a system-initiated kill of token 300.

The selection of a token kill may be useful if the token has been lost or stolen. By designating that the token has been "killed", all data on that token will be erased or die token rendered inoperable if the token is used again in an attempt to access TPS 205. Thus, if a thief or other third party attempts to use the killed token, TPS 205 may react by overwriting the token and setting a bit on the token to indicate that it is inoperable. Such a bit may be used by the token's operating system or any applets to check the validity of that token.

The interface 305 may be configured as communication conduit for data between the token and the token management system 120. The interface 305 may comply with existing smart card interface standards as known to those skilled in the art. In some embodiments, token 300 verifies that the kill instruction by checking the PUT data, the PUT key APDU's) delivered to token 300. In addition, token 300 may also check that the kill instruction is delivered over an open platform secure channel to interface 305. In some embodiments, only TPS 205 is authorized to open an open platform secure channel with token 300. The processor 310 may be configured to provide a computing platform for the functions of the token. For example, the processor 310 can transfer data, execute applets stored in the memory 315. The memory 315 may be configured to store information such as private keys, data, applets (small applications). The memory 315 may be partitioned into blocks 320-324.

Accordingly, a user may mark the token for destruction by a menu option on a user interface executed by the security client 130. The security client 130 may send a message that contains a pre-determined code in the memory 315 indicating the token is to be killed. Once the token has been marked, a subsequent token operation will activate the kill sequence to kill the token, as described with respect to FIG. 4.

Figure 4:
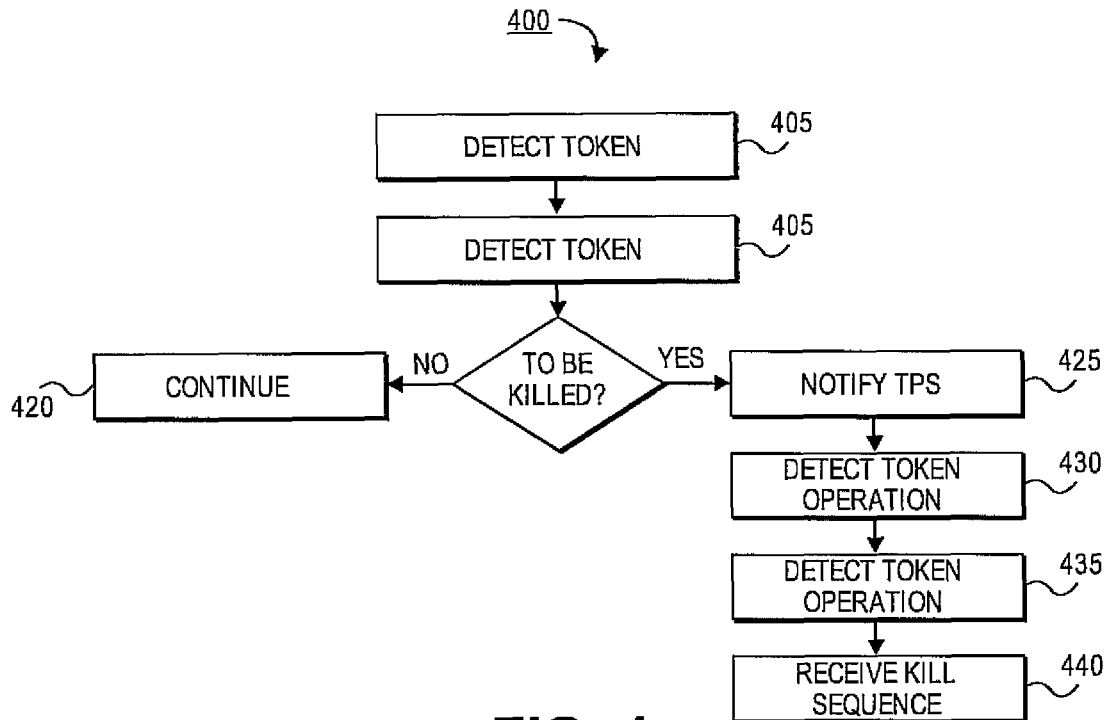
FIG. 4 illustrates an exemplary flow diagram in accordance with yet another embodiment.
Figure 5:
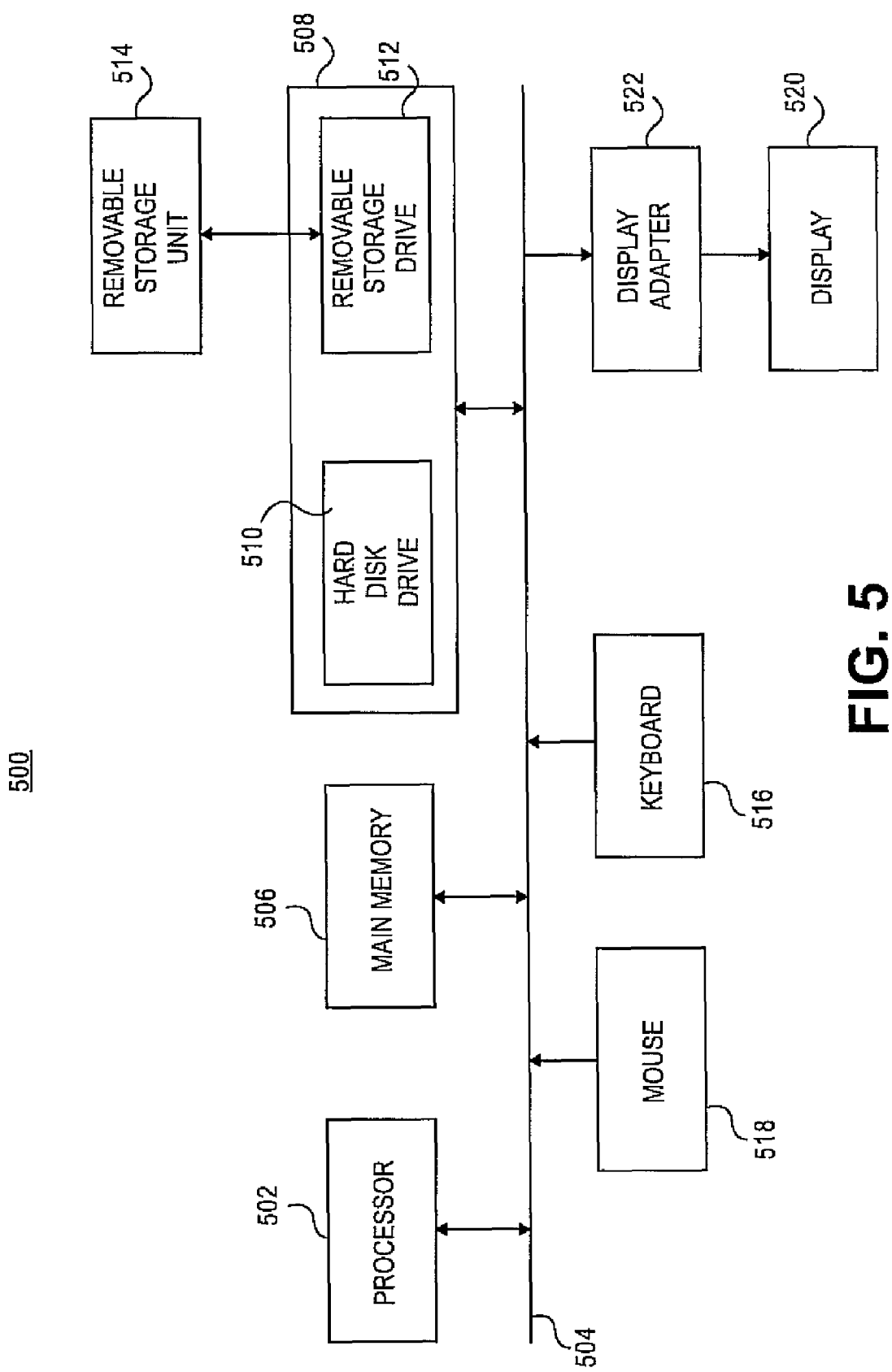
FIG. 5 illustrates an exemplary computing platform.

FIG. 4 illustrates a flow diagram 400 executed by the security client 130 in accordance with yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, the security client 130 may detect a marked token, e.g., token 300, in the security device 125, in step 405. The security client 130 may begin an authentication process which may comprise a handshake protocol where the token can be queried to determine whether the token has been marked or the data that indicates the kill status can be read from the memory 315 by the security client 130, in step 410.

If the status is that the token is not marked, in step 415, the security client 130 may be configured to permit operations with the token, in step 420. Otherwise, if the status is that the token is marked, in step 415, the security client 130 may be configured to notify the token management system 120 that the token is marked for a kill sequence, in step 425.

In step 430, the security client 130 may detect a token operation (e.g., personal identification number reset, enrollment request, a key recovery request, etc.). The security client 130 may signal the token management system 120 to issue the kill sequence, which is received by the security client 130 in step 435. The commands found in the kill sequence comply with Open Platform application data program units as known to those skilled in the art. Subsequently, the kill sequence is forwarded to the token, which proceeds to erase the data stored in the memory and then overwrite zeros in each memory location.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of managing a token device, the method comprising:
   receiving, at an interface of a client device, a request from a user to mark the token device to be disabled;
   sending, by the client device to the token device, in response to receiving the request, an electronic message comprising code indicating that the token has been marked to be disabled;
   detecting, by the client device, a presence of the token device at the client device;
   determining, by the client device, whether the detected token device is marked to be disabled; and
   sending, by the client device to the token device, in response to said determining that the detected token device is marked to be disabled, an electronic signal comprising commands to disable the token device.

2. The method of claim 1, wherein the disabling the token device comprises overwriting zeros on at least one private key.

3. The method of claim 1, wherein the disabling the token device comprises:
   erasing at least one private key; and
   overwriting zeros on a location of the at least one private key.

4. The method of claim 1, wherein the detecting the presence of the token device comprises detecting a requested operation from the token device.

5. The method of claim 4, wherein the requested operation is one of an enrollment, an application, and a personal identification number reset request.

6. The method of claim 4, the method further comprising:
   transmitting the requested operation to a server; and
   receiving the electronic signal from the server.

7. The method of claim 1, wherein the commands comply with Open Platform requirements.

8. The method of claim 1, further comprising opening a secure channel between the client device and the token device, and wherein said sending the electronic signal comprises sending the electronic signal over the secure channel.

9. The method of claim 1, further comprising initiating an authentication process with the token device after said detecting the presence of the token device, wherein the token device is configured to verify the electronic signal before executing the commands to disable the token device as part of the authentication process.

10. The method of claim 1, wherein the electronic signal comprises a kill sequence to disable the token device.

11. The method of claim 1, wherein a kill sequence is stored in the memory of the token device, and wherein the electronic signal comprises a command to execute the kill sequence stored in the memory.

12. The method of claim 11, wherein the kill sequence is received from a server device.

13. The method of claim 1, wherein the set of operations further comprises initiating an authentication process with the token device after said detecting the presence of the token device, wherein the token device is configured to verify the electronic signal before executing the commands to disable the token device as part of the authentication process.

14. An apparatus for managing a token device, comprising:
   a first interface configured to receive a request from a user to mark the token device to be disabled;
   a second interface configured to couple to the token device; and
   a processor configured to
      send to the token device, in response to receiving the request, stored in a memory of the token device an electronic message comprising code indicating that the token has been marked to be disabled;
      detect a presence of the token device at the second interface;
      determine whether the detected token device is marked to be disabled; and
      send, to the token device, in response to said determining that the detected token device is marked to be disabled, an electronic signal comprising commands to disable the token device.

15. A non-transitory computer-readable storage medium comprising computer-executable instructions that when executed by a computing system, cause the computing system to perform a set of operations comprising:
   receiving, at an interface of a client device, a request from a user to mark the token device to be disabled;
   sending, by the client device to the token device, in response to receiving the request, an electronic message comprising code indicating that the token has been marked to be disabled;
   detecting, by the client device, a presence of the token device at the client device;
   determining, by the client device, whether the detected token device is marked to be disabled; and
   sending, by the client device to the token device, in response to said determining that the detected token device is marked to be disabled, an electronic signal comprising commands to disable the token device.

16. The computer-readable storage medium of claim 15, wherein the set of operations further comprises opening a secure channel between the client device and the token device, and wherein said sending the electronic signal comprises sending the electronic signal over the secure channel.

17. A system for managing a token device, the system comprising:
   a server configured to execute a token management system;
   at least one client configured to couple with the server, wherein the at least one client is configured to execute a security client configured to:
      receive a request from a user to mark the token device to be disabled;

send, to the token device, in response to the request, an electronic message comprising code indicating that the token has been marked to be disabled;

determine whether the detected token device is marked to be disabled;

notify the token management system that the token device is marked to be disabled; and a token interface adapted to detect a presence of the token device and configured to interface with the security client, wherein the token management system, in response to the notification from the security client, sends an electronic signal comprising commands to disable the token device.

18. The system of claim 17, wherein the security client is configured to delete at least one private key stored on the token device and overwrite zeros on a storage location of the at least one private key.

19. The system of claim 17, wherein the client token interface detects the presence of the token device based on a requested operation from the token device.

20. The system of claim 19, wherein the requested operation is one of an enrollment, an application, and a personal identification number reset request.

21. The system of claim 17, wherein the commands comply with Open Platform requirements.

* * * * *